(12) United States Patent
Ottoson

(10) Patent No.: US 9,101,889 B2
(45) Date of Patent: Aug. 11, 2015

(54) APPARATUS FOR ADDING A GAS TO A LIQUID-FILLED BOTTLE

(76) Inventor: Ake Ottoson, Vasteras (SE)

( * ) Notice: Subject to any disclaimer, the term of this patent is extended or adjusted under 35 U.S.C. 154(b) by 477 days.

(21) Appl. No.: 13/377,435

(22) PCT Filed: Jun. 9, 2010

(86) PCT No.: PCT/SE2010/000158
§ 371 (c)(1),
(2), (4) Date: Dec. 9, 2011

(87) PCT Pub. No.: WO2010/144017
PCT Pub. Date: Dec. 16, 2010

(65) Prior Publication Data
US 2012/0085067 A1 Apr. 12, 2012

(30) Foreign Application Priority Data
Jun. 12, 2009 (SE) ...................................... 0900801

(51) Int. Cl.
*B01F 3/04* (2006.01)
*B01F 3/00* (2006.01)
*F16K 15/18* (2006.01)

(52) U.S. Cl.
CPC ............. *B01F 3/04794* (2013.01); *F16K 15/18* (2013.01)

(58) Field of Classification Search
CPC ........ B65D 50/08; B65D 51/16; B65D 55/00; B67C 3/04; B67C 3/00; B65B 1/04; A23F 3/00; C12G 1/06; A23C 3/037; F02M 9/08; F02M 5/08; B01F 3/00; B01F 3/04
USPC .......... 99/323.1–323.2; 426/477, 474; 141/17, 141/98, 329; 215/228, 260, 262; 261/44.2, 261/42, 43, 19, 76, 38, 65
See application file for complete search history.

(56) References Cited

U.S. PATENT DOCUMENTS 2,731,906 A * 1/1956 King ............................ 99/323.2
3,010,477 A * 11/1961 Graham ................... 137/516.25
3,397,780 A * 8/1968 Beuzeval ...................... 209/137
(Continued)

FOREIGN PATENT DOCUMENTS

DE 612192 C 4/1935
DE 19816429 A1 10/1999
(Continued)

OTHER PUBLICATIONS

International Search Report for PCT/SE2010/000158, Completed by the Swedish Patent Office on Jul. 19, 2010, 4 pages.

*Primary Examiner* — Dana Ross
*Assistant Examiner* — Michael Laflame, Jr.
(74) *Attorney, Agent, or Firm* — Brooks Kushman P.C.

(57) ABSTRACT

An apparatus for adding, from a gas container with a gas under an overpressure via a pressure reducing valve unit to a bottle fully or partly filled with a liquid while utilizing a two-part valve arrangement. The first part of the arrangement is related to the valve unit and a second part of the arrangement is related to the bottle. The two parts of the valve arrangement are easily coordinated with each other and easily separable. One valve part is adapted to enclose a first check valve which, when being mechanically influenced, allows gas flow from the container and into the bottle. The other valve part is adapted to enclose a second check valve which, when being pneumatically influenced, allows gas flow into the bottle.

20 Claims, 2 Drawing Sheets

(56) References Cited

U.S. PATENT DOCUMENTS

| | | | | |
|---|---|---|---|---|
| 3,472,425 A | * | 10/1969 | Booth et al. | 222/129.1 |
| 3,476,142 A | * | 11/1969 | Schultz | 137/512 |
| 4,399,081 A | * | 8/1983 | Mabb | 261/121.1 |
| 4,548,828 A | * | 10/1985 | Meyers | 426/477 |
| 4,610,282 A | * | 9/1986 | Brooks et al. | 141/46 |
| 4,636,337 A | * | 1/1987 | Gupta et al. | 261/64.3 |
| 4,786,519 A | * | 11/1988 | Gupta | 426/561 |
| 4,850,269 A | * | 7/1989 | Hancock et al. | 99/323.1 |
| 5,102,627 A | * | 4/1992 | Plester | 422/112 |
| 5,188,257 A | * | 2/1993 | Plester | 222/1 |
| 5,192,513 A | * | 3/1993 | Stumphauzer et al. | 422/305 |
| 5,260,081 A | * | 11/1993 | Stumphauzer et al. | 426/477 |
| 5,329,975 A | * | 7/1994 | Heitel | 141/19 |
| 6,463,964 B2 | * | 10/2002 | Clusserath | 141/40 |
| 7,288,276 B2 | * | 10/2007 | Rona et al. | 426/477 |
| 7,325,579 B2 | * | 2/2008 | Harding | 141/98 |
| 7,374,156 B2 | * | 5/2008 | Ooyachi et al. | 261/36.1 |
| 7,377,495 B1 | * | 5/2008 | Thompson et al. | 261/39.1 |
| 7,533,701 B2 | * | 5/2009 | Gadzic et al. | 141/54 |
| 8,360,119 B2 | * | 1/2013 | Huang et al. | 141/329 |
| 2006/0283523 A1 | * | 12/2006 | Gadzic et al. | 141/330 |
| 2007/0023100 A1 | * | 2/2007 | Blichmann | 141/18 |

FOREIGN PATENT DOCUMENTS

| | | |
|---|---|---|
| DE | 20018510 U1 | 3/2001 |
| EP | 0894769 A2 | 2/1999 |

* cited by examiner

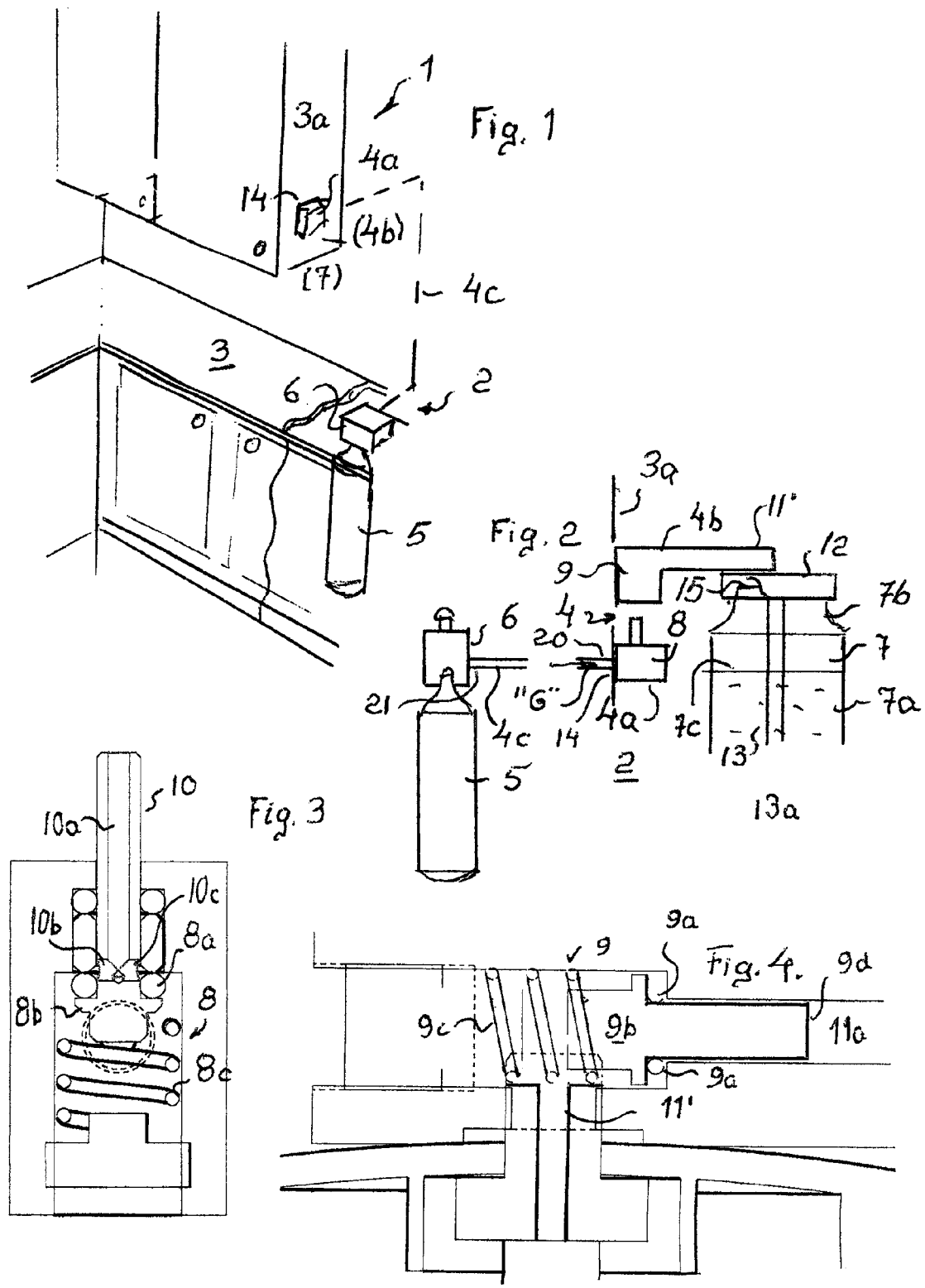

US 9,101,889 B2

APPARATUS FOR ADDING A GAS TO A LIQUID-FILLED BOTTLE

CROSS-REFERENCE TO RELATED APPLICATION

This application is the U.S. national phase of PCT Appln. No. PCT/SE2010/000158 filed Sep. 6, 2010 which claims priority to Swedish application 0900801-2 filed Jun. 12, 2009, the disclosures of which are incorporated in their entirety by reference herein.

TECHNICAL FIELD OF THE INVENTION

The present invention generally relates to an apparatus for adding, from a container with a gas, such as a $CO_2$ gas, put under an overpressure, said gas, via a pressure reducing valve unit, to a bottle fully or partly filled with a liquid.

This addition and transfer of gas will be performed while utilizing a two-part valve arrangement, wherein the parts can be easily coordinated with each other and easily separated from each other, to be able to transfer said gas in a coordinated manner under an overpressure from the container to the bottle.

A first part of this two-part valve arrangement is related downstream of the pressure reducing valve unit and a second part of this valve arrangement is related upstream of the bottle itself, where downstream and upstream are related to the direction of the gas from the container to and into the bottle.

BACKGROUND OF THE INVENTION

Methods, arrangements and constructions related to the above technical field and nature, are previously known in a plurality of different embodiments.

As a first example of the technical background and the technical field to which the invention relates, may be mentioned such apparatuses that are traded, sold and used under the trademark "Sodastream".

Such an apparatus is based upon adding from a container with $CO_2$ gas put under an overpressure, via a pressure reducing valve unit, said gas, to a bottle fully or partly filled with a liquid (water).

This is performed while utilizing a simple two-part valve arrangement, in which a first part of the arrangement shall be related to the pressure reducing valve unit and a second part of the arrangement shall be directly related to the bottle.

"Sodastream" is offered as a unit, within a pressurized small container enclosed with $CO_2$ gas and with an outwardly open space or cavity for placement of a bottle fully or partly filled with liquid therein. This suggested two-part valve arrangement is based upon allowing the open portion or neck of the bottle to be pressed to make sealing contact with an opposite valve seat and thereafter to open a check valve to create conditions for transferring an adapted amount of gas at an overpressure to the bottle and the liquid, after which the bottle with its open portion open can be removed.

The gas or the amount of gas added to the liquid at such an overpressure has a tendency to cause the liquid to "bubble" over at a sudden reduced pressure within the bottle or a sudden pressure drop.

A gas that in this way, at an overpressure, is added to a liquid within a bottle has been shown to have a limited durability, as the gas at one atmospheric pressure has a tendency to quickly leave the liquid in the bottle.

Even if the opening of the bottle is sealed, by means of a seal (eller screw stopper), immediately after the gas is allowed to pass into the liquid, it has been shown that the gas addition is reduced quite quickly within the short time that the bottle is leaving the valve arrangement and the seal is applied.

Considering the present invention and the two-part valve arrangement suggested therein, it can be mentioned that similar arrangements have been proposed within other technical fields than the one applicable to the present invention and the disclosure.

Such known two-part valve arrangements have a first valve part, related to the pressure source, and a second valve part, related to a robust container, dimensioned for a high internal pressure, wherein the first valve part comprises a manually influenced check valve, while the second valve part comprises a check valve influenced by an overpressure applied from the outside, wherein the manually influenced check valve is adapted to open for a flow of air, while the pneumatically influenced check valve is adapted to open for an overpressure effective from the outside.

SUMMARY OF THE PRESENT INVENTION

Technical Problem

When taking into account that the technical considerations a person skilled in the relevant technical field has to make, in order to be able to present a solution to one or more technical problems raised, initially require a necessary understanding of the measures and/or the sequence of measures that should be taken as well as a necessary choice of the means that is or are required, the subsequent technical problems should, in view of this, be considered as relevant in creating the present subject of invention.

When taking the prior art into consideration, as it is described above, it should therefore be seen as a technical problem to be able to realize the significance of, the advantages associated with, and/or the technical measures and considerations that will be required, based on a previously known apparatus, for adding, from a container with a gas, such as a $CO_2$ gas, put under an overpressure, said gas, via a pressure reducing valve unit, to a bottle fully or partly filled with a liquid, wherein this addition shall be able to be while utilizing a two-part valve arrangement, wherein a first part of the arrangement shall be related to the pressure reducing valve unit and a second part of the arrangement shall be related to the bottle, to suggest an apparatus, with a construction having a plurality of individual and separable parts, that will require a non-significant, or no, place on a workbench within a kitchen region.

There is a technical problem to be able to realize the significance of, the advantages associated with, and/or the technical measures and considerations that will be required to suggest a construction that permits to separate, from the point of view of space, a container with a pressure reducing valve unit from the bottle via the two-part valve arrangement and a tube or a pipe.

There is a technical problem to be able to realize the significance of, the advantages associated with, and/or the technical measures and considerations that will be required to suggest a construction where it will be possible to attach the first part of the valve arrangement to a wall section, so that a bottle with this first part can interact with its second part of the valve arrangement applied to the open part of the bottle, in a simple coordinated or separating manner only by a vertical displacement movement of the second part in relation to the first part fixed to the wall.

There is a technical problem to be able to realize the significance of, the advantages associated with, and/or the technical measures and considerations that will be required to allow the bottle with an applied second part, to be separated from the fixedly mounted first part by means of a slightly upwardly directed movement.

There is a technical problem to be able to realize the significance of, the advantages associated with, and/or the technical measures and considerations that will be required to suggest the possibility to separate a container with the pressure reducing valve unit from the first part within the valve arrangement by means of a tube or a pipe adapted for a high, though reduced pressure.

There is a technical problem to be able to realize the significance of, the advantages associated with, and/or the technical measures and considerations that will be required to allow the two parts of said two-part valve arrangement to be easily coordinated with each other and easily separated from each other, via a simple relative movement between a vertically oriented or a substantially vertically oriented inserted thin pipe section movable in its axial direction, for allowing a check valve to open at and by a mechanical displacement of the pipe section by means of the second valve part.

There is a technical problem to be able to realize the significance of, the advantages associated with, and/or the technical measures and considerations that will be required to allow one of the valve parts to be adapted to and constructed for enclosing a first check valve which, when being mechanically influenced, is adapted to allow a gas flow from the container and/or its reducing valve to and into the bottle.

There is a technical problem to be able to realize the significance of, the advantages associated with, and/or the technical measures and considerations that will be required to allow the second valve part to be adapted to and constructed for enclosing a second check valve which, when being pneumatically influenced, is adapted to allow a gas flow through an open first check valve and an open second check valve and into the bottle, whereas said check valves, when the two valve parts are being separated from each other, are adapted to allow to arrest the gas flow without such a mechanical and pneumatic influence.

There is a technical problem to be able to realize the significance of, the advantages associated with and/or the technical measures and considerations that will be required to allow the first valve part to be shaped with an upwardly directed short and thin pipe section, whereas the second valve part shall then be shaped with a downwardly directed thin channel, adapted, in an interacting position with each other, to be able to tightly enclose and seal said pipe section and/or channel against the atmosphere.

There is a technical problem to be able to realize the significance of, the advantages associated with, and/or the technical measures and considerations that will be required to allow the second valve part to exhibit said channel and laterally arranged with respect to said channel, an upper open portion of the bottle provided with an outer thread, which can be coordinated with a seal provided with an inner thread.

There is a technical problem to be able to realize the significance of, the advantages associated with and/or the technical measures and considerations that will be required to allow said second valve part with its seal to exhibit a pipe section intended for a gas flow, dimensioned with a length so as to allow its orifice to be located below an upper surface of a liquid contained within the bottle.

There is a technical problem to be able to realize the significance of, the advantages associated with, and/or the technical measures and considerations that will be required to allow said bottle to consist of a plastic bottle, constructed and dimensioned to be able to withstand an adapted overpressure less than the overpressure for the container or pressure source, but adapted to the reduced pressure of the valve unit.

There is a technical problem to be able to realize the significance of, the advantages associated with, and/or the technical measures and considerations that will be required to suggest the presence of a gasket sealing against the inner pressure of the bottle, between the seal and the upper open portion of the bottle.

There is a technical problem to be able to realize the significance of, the advantages associated with, and/or the technical measures and considerations that will be required to allow the first valve part to be shaped with an attaching means, intended to be able to fixedly interact with a wall section or the like and where a tube being under an overpressure shall be adapted to extend from a shaped tube attachment in said first valve part to the pressure reducing valve unit.

The Solution

The present invention thus is based on the known technique described in the introduction and is built on an apparatus for adding, from a container with a gas, such as a $CO_2$ gas, put under an overpressure, said gas under an overpressure, via a pressure reducing valve unit, to a bottle fully or partly filled with a liquid, while utilizing a two-part valve arrangement, wherein a first part of the arrangement is related to the container and a pressure reducing valve unit, and a second part of the arrangement is related to the bottle.

In order to be able to solve one or more of the above-mentioned technical problems, the present invention more specifically suggests that the technique known in this manner shall be supplemented by allowing the two parts of said two-part valve arrangement, in a known manner, to be easily coordinated with each other and easily separated from each other via a mutual relative movement, especially a vertical oriented relative movement.

In addition, it is suggested that one of the valve parts shall be adapted to enclose a first check valve which, when being mechanically influenced, is adapted to allow a gas flow from the container with the pressure reducing valve unit and into the bottle, whereas the second part is adapted to enclose a second check valve which, when being subjected to an outer pneumatic influence is adapted to allow a gas flow through the first check valve and into the bottle, whereas said check valves, when the valve parts for the valve arrangement are being separated from each other, are adapted, without such a mechanical and pneumatical influence, to allow to arrest the gas flow out of the container and out of the bottle.

As suggested embodiments, falling within the scope of the fundamental idea of the present invention, it is further suggested that the first valve part shall be shaped with an upwardly directed pipe section, whereas the second valve part shall be shaped with a downwardly directed channel, adapted to be able to enclose and displace said pipe section in a position acting gastightly against the atmospheric pressure.

More specifically it is suggested that the second valve part shall exhibit said channel and laterally arranged with respect to said channel there shall be structured an upper open portion of the bottle provided with an outer thread, which can be coordinated with a seal provided with an inner thread.

However, said seal shall exhibit a pipe section intended for a free gas flow into the bottle, dimensioned with a length so as to allow its orifice to be located below an upper surface of a liquid contained in the bottle.

The bottle should advantageously consist of a plastic bottle, dimensioned to be able to withstand an adapted overpressure less than the overpressure within the container and the reducing overpressure from the pressure unit.

Between the seal and the upper open portion of the bottle there is provided an elastic and sealing gasket.

The first valve part shall be shaped with an attaching means, intended to be able to fixedly interact with a wall section or the like and where a tube, a pipe or the like is adapted to extend from a shaped first tube or pipe attachment in said first valve part to a shaped second tube or pipe attachment in the pressure reducing valve unit.

Advantages

The advantages that may primarily be regarded as characteristic of the present invention and the special significant features provided thereby are that, in this way, conditions have been created, for adding, by an apparatus from a container with a gas, such as a $CO_2$ gas, put under an overpressure, said gas, via a pressure reducing valve unit, to a bottle fully or partly filled with a liquid, while utilizing a two-part valve arrangement, wherein a first valve part of the arrangement is related to valve unit and a second part of the arrangement is related to the bottle, to suggest that the two valve parts of said two-part valve arrangement shall be easily coordinated with each other and easily separated from each other, in order to be able to provide the interior of the bottle with a pressurized gas in a co-ordinated position.

The invention suggests that one of the valve parts of the valve arrangement shall be adapted to enclose a first check valve which, when being mechanically influenced, is adapted to allow a gas flow from the container, valve unit and into the bottle, whereas the other valve part shall be adapted to enclose a second check valve which, when being pneumatically influenced from the valve part, is adapted to allow a gas flow through the first check valve and into the bottle, whereas said check valves, when the valve parts are being separated from each other, are adapted to allow to arrest a free gas flow out from the container and its valve unit and out from the bottle without such a mechanical influence and without such a pneumatical impact and influence.

What is primarily to be regarded as characteristic of the present invention is stated in the characterizing clause of the subsequent patent claim 1.

BRIEF DESCRIPTION OF THE DRAWINGS

One currently suggested embodiment, showing the significant features associated with the present invention, will now be described in more detail by way of example with reference to the accompanying drawings, wherein;

FIG. 1 schematically shows a kitchen environment, where an apparatus, according to the specific conditions of the invention, is shown applied with a container and a valve unit mounted in a lower cupboard and with a first valve part, of a two-part valve arrangement, fixedly mounted to an outer side of an upper cupboard, FIG. 2 shows an overview of the details associated with the present invention comprised in an apparatus with a container, a reducing valve unit for the pressure in the container, a tube or pipe dimensioned for the reduced pressure and a first valve part of the valve arrangement oriented adjacent to (however separated from) a second valve part of the valve arrangement belonging to a bottle, FIG. 3 shows a cross section of a first valve part of the valve arrangement with a built-in check valve in a sealing position, FIG. 4 shows a cross section of a second valve part of the valve arrangement with a built-in check valve in a tightening position, and, FIG. 5 shows the first and the second valve part in a coordinated position with each other and with the check valve related to the first valve part in an open position.

DESCRIPTION OF NOW PROPOSED EMBODIMENT

Figure 5:
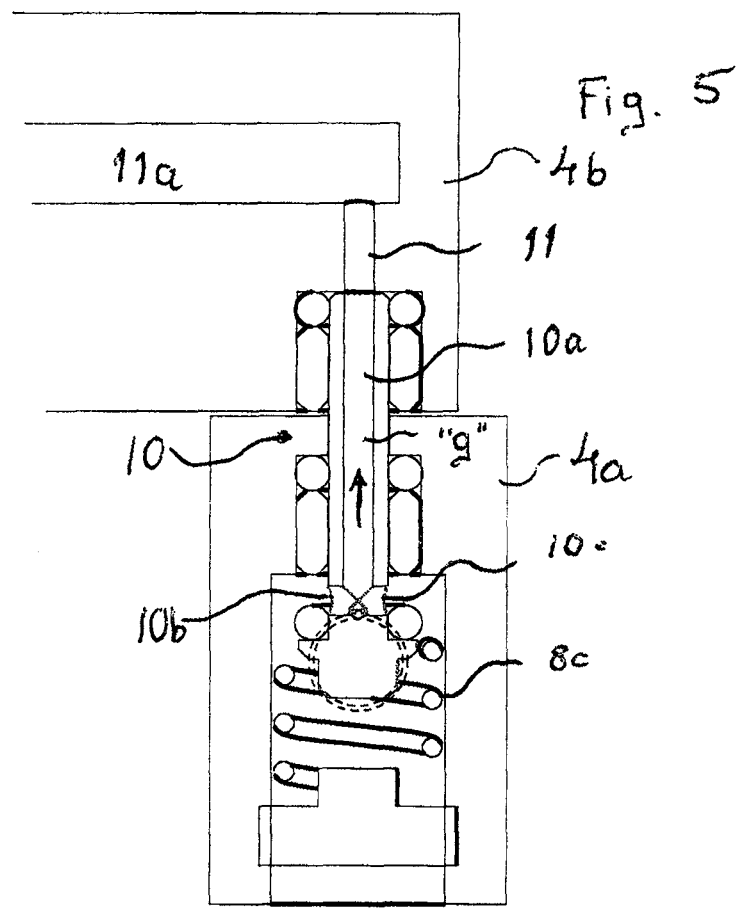

It should be emphasized by way of introduction that in the subsequent description of a presently proposed embodiment, which exhibits the significant features associated with the invention and which is elucidated by the shown figures in the appended drawings, we have chosen terms, and a particular terminology with the intention to thereby primarily allow to make clear the fundamental idea of the invention.

It should, however, in this connection be taken into consideration that expressions chosen here should not be seen as limited solely to the terms utilized and chosen here, but it should be understood that each term chosen in this manner should be interpreted so that it, in addition, comprises all technical equivalents that function in the same or substantially the same way, in order to, in this way, enable the achievement of the same or substantially the same intention and/or technical effect.

With reference to the appended FIGS. 1 to 5, there are thus schematically shown and in detail the fundamental conditions for the present invention and with the significant features associated with the invention having been made concrete, by the now proposed embodiment which is described in more detail in the following.

Thus, FIG. 1 shows a kitchen environment 1, within a complete apparatus 2, according to the suggestions of the invention, installed and then in such a manner that the apparatus and its individual parts do not need to occupy any working surface 3, which a known construction normally requires.

For this purpose it is shown in FIG. 2 that a first valve part 4*a*, of a two-part valve arrangement, is mounted on a wall or a cupboard 3*a* and that the first valve part 4*a* as well as a container 5 are coordinated with each other via a tube 4*c*.

The proposed apparatus 2 according to the invention is intended for adding, from a container 5 with a gas, such as a $CO_2$ gas, put under an overpressure, said gas "G" through coordinated check valves, via a pressure reducing valve unit 6, to a bottle 7 fully or partly filled with a liquid 7*a*.

This will then be performed while utilizing the two-part 4*a*, 4*b* valve arrangement 4, wherein the first valve part 4*a* of the arrangement is related to the valve unit 6 and the second part 4*b* of the arrangement is related to the bottle 7.

The invention requires for its practical application that the two parts 4*a*, 4*b* of said two-part valve arrangement 4 shall be easily coordinated with each other and easily separated from each other, and it is here suggested a simple relative movement in a purely vertical direction. This relative movement may also be realized through other chosen directions.

More specifically it is suggested that the first valve part 4*a* shall be adapted to enclose a first check valve 8, which, when being mechanically influenced, shall be adapted to allow a gas flow from the container 5 via the reducing valve 6 and the valve arrangement 4 and into the bottle 7.

The second valve part 4*b* shall be adapted to enclose a second check valve 9, which, when being pneumatically influenced, shall be adapted to allow a gas flow through the mechanically influenced first check valve 8, via the valve arrangement 4 and into the bottle 7.

Said check valves 8, 9, when the valve parts 4a and 4b are being separated from each other according to FIG. 2, are adapted to allow to arrest the gas flow without such a mechanical and pneumatic influence, from the container 5 and the valve unit 6 as well as the bottle 7 and to the atmospheric pressure.

More specifically it is suggested that the first valve part 4a shall be shaped with an upwardly directed pipe section 10, arranged to be movable upwards and downwards, whereas the second valve part 4b shall be shaped with a downwardly directed channel 11, adapted, in an upwardly directed interacting position according to FIG. 5, to be able to enclose said pipe section 10 and press this section downwards for a mechanical influence of the check valve 8 to an open position.

The second valve part 4b exhibits said channel 11 and laterally arranged with respect to said channel 11 a channel 11', an upper open portion (7b) of the bottle (7) provided with an outer thread, which can be coordinated with a seal 12 provided with an inner thread.

Said seal 12 exhibits a pipe section 13 intended for a gas flow, dimensioned with a length so as to allow its orifice 13a to be located below an upper surface 7c of a contained liquid 7a.

The bottle 7 consists of a plastic bottle dimensioned to be able to withstand a chosen overpressure less than not only the prevailing overpressure for the container, but also the reduced overpressure from the valve unit 6.

Between the seal 12 and the upper open portion 7b of the bottle 7 there is provided a gasket 15 to seal between the neck portion of the bottle and the second valve part 4b or the seal 12.

The second valve part 4b shall be shaped with an attaching means 14, intended to be able to fixedly interact with a wall section or the like 3a and where a tube or a pipe 4c is adapted to extend from a shaped first pipe attachment 20 in said second valve part 4a to a shaped second pipe attachment 21 in said pressure reducing valve unit 6.

With reference to FIG. 3 it is shown that the pipe section 10 within the check valve is in its uppermost position and with an O-ring 8a for a seal.

The valve cone 8b is pressed to its sealing position by a pressure spring 8c.

The pipe section 10 exhibits a channel 10a and within its lower region two channel branches 10b and 10c, which are sealed in FIG. 3.

With reference to the FIG. 4 there is shown a pipe section 11' within the check valve 9.

The valve 9 shows the valve cone 9b in a sealing position by a pressure spring 9c.

The valve cone 9b of check valve 9 is inserted in a channel 11a and seals via an O-ring 9a.

A pneumatic pressure against the surface 9d displaces the valve cone 9b to the left and the valve 9 opens.

The invention is of course not restricted to the above described exemplifying embodiment but modifications may be made within the scope of the inventive concept illustrated in the accompanying patent claims.

Especially it is to be noted that each unit and/or circuit shown here may be combined with each other unit and/or circuit within the frame to be able to achieve the desired technical function.

The invention claimed is:

1. An apparatus for adding, from a gas container with a gas, put under an overpressure, said gas, via a pressure reducing valve unit, to a bottle fully or partly filled with a liquid comprising a two-part valve arrangement, wherein a first part of the arrangement is related to the container and its valve unit, and a second part of the arrangement is related to the bottle, wherein the first and second parts of said two-part valve arrangement are connectable with each other and separatable from each other, where the first part includes a first check valve which is mechanically openable to allow a gas flow from the container via the valve unit and into the bottle, whereas the second part includes a second check valve which is pneumatically openable to allow a gas flow from the first check valve and into the bottle, whereas said first and second check valves, when the first and second parts are separated from each other, are adapted to arrest the gas flow with the first check valve arresting gas flow from the gas container and the second check valve arresting gas flow back from the bottle, wherein the first part includes an attachment configured to be fixed to a wall section and a tube or a pipe is adapted to extend from a shaped attachment within said first part to the pressure reducing valve unit related to the container.

2. The apparatus according to claim 1, wherein the first part is shaped with an upwardly directed pipe section, whereas the second part is shaped with a channel, adapted to enclose said pipe section in an interacting position.

3. The apparatus according to claim 2, wherein the second part includes said channel and, laterally arranged with respect to said channel, an upper open portion of the bottle provided with an outer thread, which can be coordinated with a seal provided with an inner thread.

4. The apparatus according to claim 3, wherein said seal includes a pipe section intended for a gas flow, dimensioned with a length so as to allow its orifice to be located below a surface of a contained liquid.

5. The apparatus according to claim 1, wherein the bottle consists essentially of a plastic bottle, dimensioned to be able to withstand an overpressure less than the overpressure for the container.

6. The apparatus according to claim 3, wherein between the seal and the upper open portion of the bottle there is provided a gasket,
   wherein the first check valve includes a first valve seat that is urged into the closed position by a spring and mechanical opening of the first check valve moves the seat to allow gas flow from the container toward the bottle;
   wherein the second check valve includes a second valve seat that is urged into a closed position by a spring and pneumatic opening occurs when the first check valve is mechanically opened and the gas pressure moves the second check valve into the open position against the urging of the spring and pressure in the bottle.

7. The apparatus according to claim 2, wherein the second part includes said channel and, laterally arranged with respect to said channel, an upper open portion of the bottle provided with an outer thread, which can be coordinated with a seal provided with an inner thread.

8. The apparatus according to claim 7, wherein said seal includes a pipe section intended for a gas flow, dimensioned with a length so as to allow its orifice to be located below a surface of a contained liquid.

9. The apparatus according to claim 3, wherein between the seal and the upper open portion of the bottle there is provided a gasket.

10. The apparatus according to claim 7, wherein between the seal and the upper open portion of the bottle there is provided a gasket.

11. The apparatus according to claim 1, wherein the two-part valve arrangement is adapted to provide $CO_2$ gas from the container into the bottle.

12. The apparatus according to claim 1, wherein the first part is remote from the second part and the first part and second part are fluidly connected by the tube, which is elongate.

13. The apparatus according to claim 1, wherein the second part is normally closed to gas flow to the bottle and is opened to gas flow when the first part is mechanically opened and pressurized gas is delivered to the second part through the first part.

14. An apparatus to add gas from a pressurized container to a bottle, comprising:
- a first valve part fluidly connected to the container, the first valve part including a first check valve with a normally sealed position and an unsealed position, wherein the first valve part is mechanically movable from the sealed position to the unsealed position to allow gas to flow from the container, wherein the sealed position prevents forward flow from the container;
- a second valve part in fluidly connected to the first valve part and the bottle, the second valve part including a second check valve with a normally closed state and an open state, wherein the second valve part is pneumatically movable from the closed state to the open state upon receipt of pressurized gas from the first valve part to allow gas to flow into the bottle and in the closed state arrests flow of gas from the bottle, which is in an opposite direction relative to the flow of gas from the container to the bottle with both the first valve part and the second valve part being in an unsealed state and an open state, respectively;
- wherein the first part is fixed to a support section; and
- wherein the second part is fixed to the support section.

15. The apparatus of claim 14, wherein the second valve part is moved vertically downwardly to mechanically engage the first valve part to unseal the first valve part for gas flow from the container.

16. The apparatus of claim 14, wherein the second valve part includes a valve cone urged into the closed state via a spring with force less than the pressurized gas.

17. The apparatus of claim 16, wherein the first valve part includes a tube with a channel with a lower region and a valve cone connected to the tube and pressed to the sealed position by a pressure spring, wherein the lower region of the channel includes two channel branches fluidly open to the container with the first valve part in the unsealed position and closed to the container with the first valve part in the sealed position.

18. The apparatus of claim 17, wherein the second valve part includes a pipe section in fluid communication with the tube of the first valve part with the first valve part coordinatingly receiving the second valve part, and the second valve part is pressed downwardly onto the first valve part against the tube to unseat the tube and move the first valve part to the unsealed position to allow gas to flow into the channel branches through the channel and the pipe section.

19. The apparatus of claim 18, wherein the valve cone of the first valve part is further urged to the sealed position by gas pressure from the container.

20. The apparatus according to claim 1, wherein the first check valve has a normally closed position and is held in an open position when installed to provide gas, and
- wherein the second check valve has a normally closed position to prevent gas from flowing back from the bottle and is configured to move to an open position with gas pressure from the container through the first check valve.

* * * * *